United States Patent [19]
Conboy et al.

[11] Patent Number: 5,187,777
[45] Date of Patent: Feb. 16, 1993

[54] MULTI-FUNCTION PRE-PROCESSOR FOR TARGET TRACKING

[75] Inventors: Mark A. Conboy, Mission Viejo; Richard Y. Ichinose, Fullerton; Ki H. Baek, El Toro, all of Calif.

[73] Assignee: Loral Aerospace Corp., New York, N.Y.

[21] Appl. No.: 411,426

[22] Filed: Sep. 21, 1989

[51] Int. Cl.⁵ ............................................. G06F 15/72
[52] U.S. Cl. ............................ 395/163; 364/DIG. 1; 364/231.8; 364/DIG. 2; 364/948.34; 395/162
[58] Field of Search ............ 364/518, 521, 522, 231.8, 364/948.34; 340/747, 750; 382/46, 49; 395/162, 163, 164

[56] References Cited

U.S. PATENT DOCUMENTS

| | | | |
|---|---|---|---|
| 4,363,104 | 12/1982 | Nussmeier | 364/515 |
| 4,433,438 | 2/1984 | Couturier | 382/41 |
| 4,464,789 | 8/1984 | Sternberg | 382/48 |
| 4,484,346 | 11/1984 | Sternberg et al. | 382/27 |
| 4,484,349 | 11/1984 | McCubbrey | 382/49 |
| 4,499,597 | 2/1985 | Alves | 382/41 |
| 4,750,144 | 6/1988 | Wilcox | 364/728 |
| 4,790,026 | 12/1988 | Gennery et al. | 382/49 |
| 4,860,218 | 8/1989 | Sleator | 364/518 |
| 4,876,651 | 10/1989 | Dawson et al. | 364/449 |
| 4,920,337 | 4/1990 | Kuo | 340/721 |
| 4,937,777 | 6/1990 | Flood et al. | 364/900 |
| 4,975,977 | 12/1990 | Korosu et al. | 382/46 |

Primary Examiner—Gary V. Harkcom
Assistant Examiner—Phu K. Nguyen
Attorney, Agent, or Firm—Harry G. Weissenberger; Anthony J. Karembelas

[57] ABSTRACT

A pre-processor (10) for target trackers is disclosed which allows several image analysis algorithms to be computed simultaneously so as to provide improved real-time target recognition. The pre-processor (10) is also equipped to compensate for the rapid rotation of the target image when the tracking aircraft performs abrupt turning maneuvers.

3 Claims, 8 Drawing Sheets

MULTI-FUNCTION PRE-PROCESSOR FOR TARGET TRACKING

FIELD OF THE INVENTION

This invention relates to target tracking devices, and more specifically to a pre-processor chip capable of running several different tracking algorithms concurrently or sequentially.

BACKGROUND OF THE INVENTION

Target tracking in high-performance aircraft involves the use of a pre-processor which analyzes the movement of a pilot-selected target across the video image seen by the pilot, and provides tracking information to a tracking device which centers the field of view of the sensor about the target.

Accurately recognizing and locating selected targets of different size, shape and intensity against complex backgrounds in successive fields of the video scan is no easy task. To provide reliable tracking, the image needs to be examined by several preprocessing algorithms which may be different for different kinds of targets. Tracking information is then derived from a comparison of the results of the algorithms used. Typically, such algorithms include geometric (for large targets) and intensity (for small targets) centroids, and convolution-based algorithms such as Sobel edge detection, brightness feature match correlation (BFMA) or Sum of Products, difference squared ($\Delta^2$), and sequential similarity detection (SSDA) algorithms.

The pre-processing task is further complicated by the fact that during abrupt maneuvers of the aircraft, the target aspect changes rapidly as a result of image rotation.

A significant factor in the design of tracking pre-processors is the fact that all calculations have to be completed in no more than 15 ms so that a new set of results can be generated for each field of the 60 Hz video scan. In the prior art, it was necessary to provide a separate pre-processor for each algorithm to allow simultaneous computation of all the results within the available time interval—an undesirable situation from the point of view of cost, weight, size and power.

Prior art in this field includes: U.S. Pat. No. 4,363,104 to Nussmeier, which deals with a process for creating multiple images for simultaneous processing; U.S. Pat. No. 4,433,438 to Couturier, which discloses a circuit for processing the Sobel square root edge extraction algorithm; U.S. Pat. No. 4,464,789 to Sternberg in which successive images are analyzed for motion therebetween; U.S. Pat. No. 4,484,346 to Sternberg et al which ties multiple chips together but basically performs only a series of 3×3 convolutions; U.S. Pat. No. 4,484,349 to McCubbrey in which a plurality of pipelines simultaneously operate on adjacent segments of an image matrix; U.S. Pat. No. 4,499,597 to Alves which describes a centroid calculation; U.S. Pat. No. 4,750,144 to Wilcox which shows a circuit for convolution computations; and U.S. Pat. No. 4,790,026 to Gennery et al which discusses a modular pipelined image processor.

SUMMARY OF THE INVENTION

Considerable economy of cost, space and weight, together with improved performance, is achieved in a tracking device by providing a multi-function pre-processor (10) capable of being implemented on a single chip. The inventive pre-processor achieves this implementation by providing a set of pipeline processors (16, 18, 20) which selectively and sequentially process image data through several algorithms in the same pipeline, all within a time interval which allows a full set of data to be generated for each field of a 60 Hz video display.

A significant pin reduction is achieved by the use of an on-chip address generator (12) which permits a large number of reads and writes to be generated from a single address pointer input (15). Also, the address generator (12), by using a pair of pipelines (22, 24), can compensate internally of the chip for rotation of the image.

DESCRIPTION OF THE PREFERRED EMBODIMENT

Figure 1:
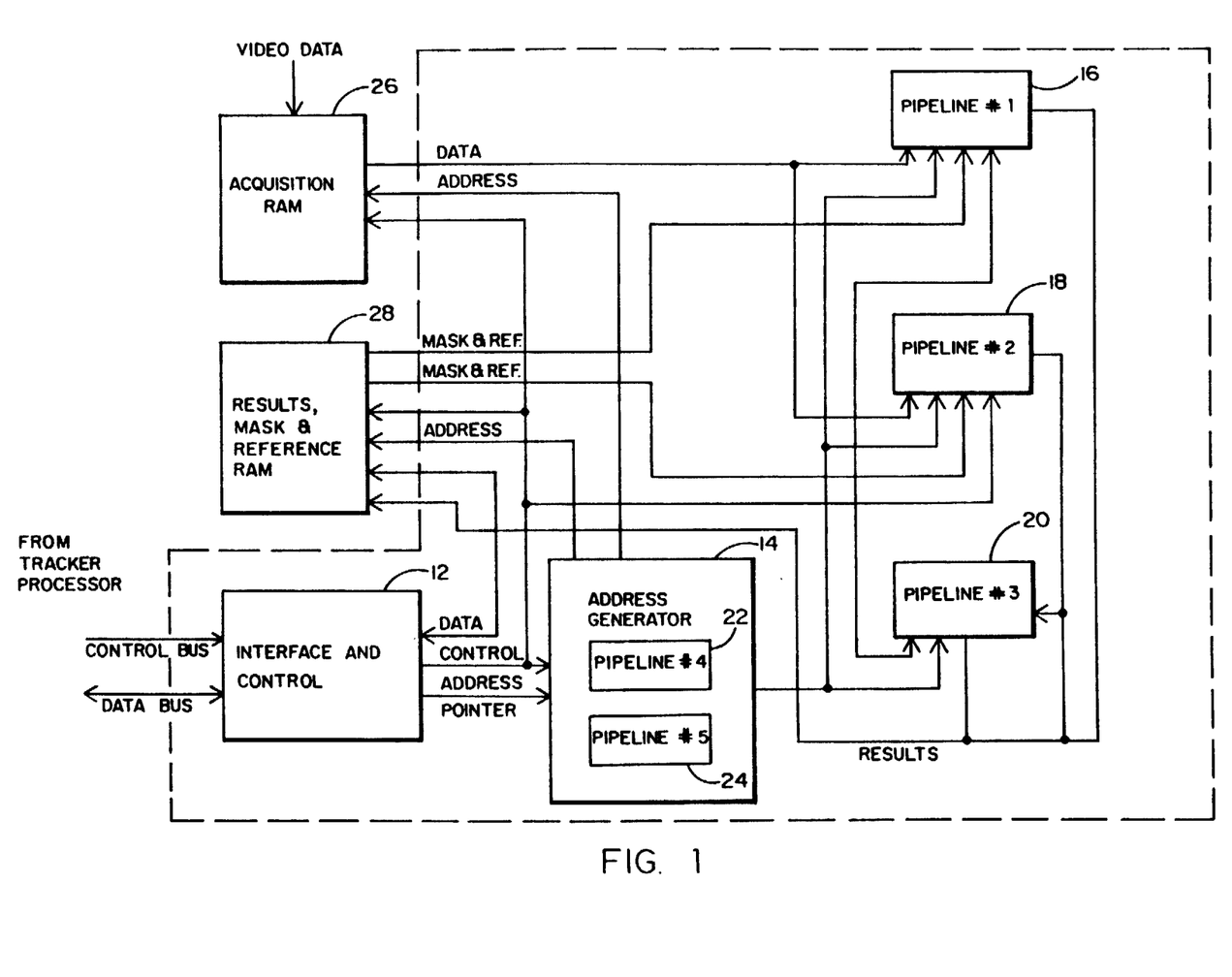
FIG. 1 is a block diagram of the pre-processor of this invention.
Figure 2A:
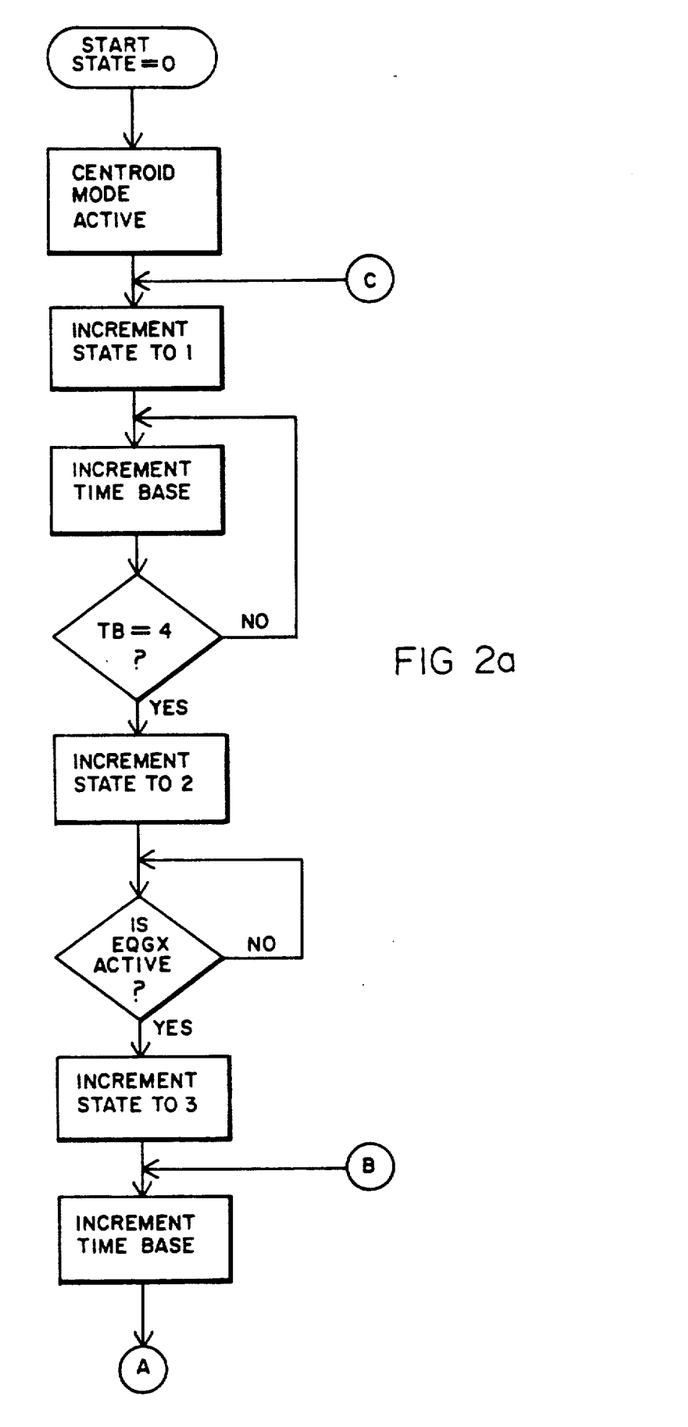
FIGS. 2a through 2e, taken together, are a flow chart diagram illustrating the operation of the pre-processor.
Figure 2B:
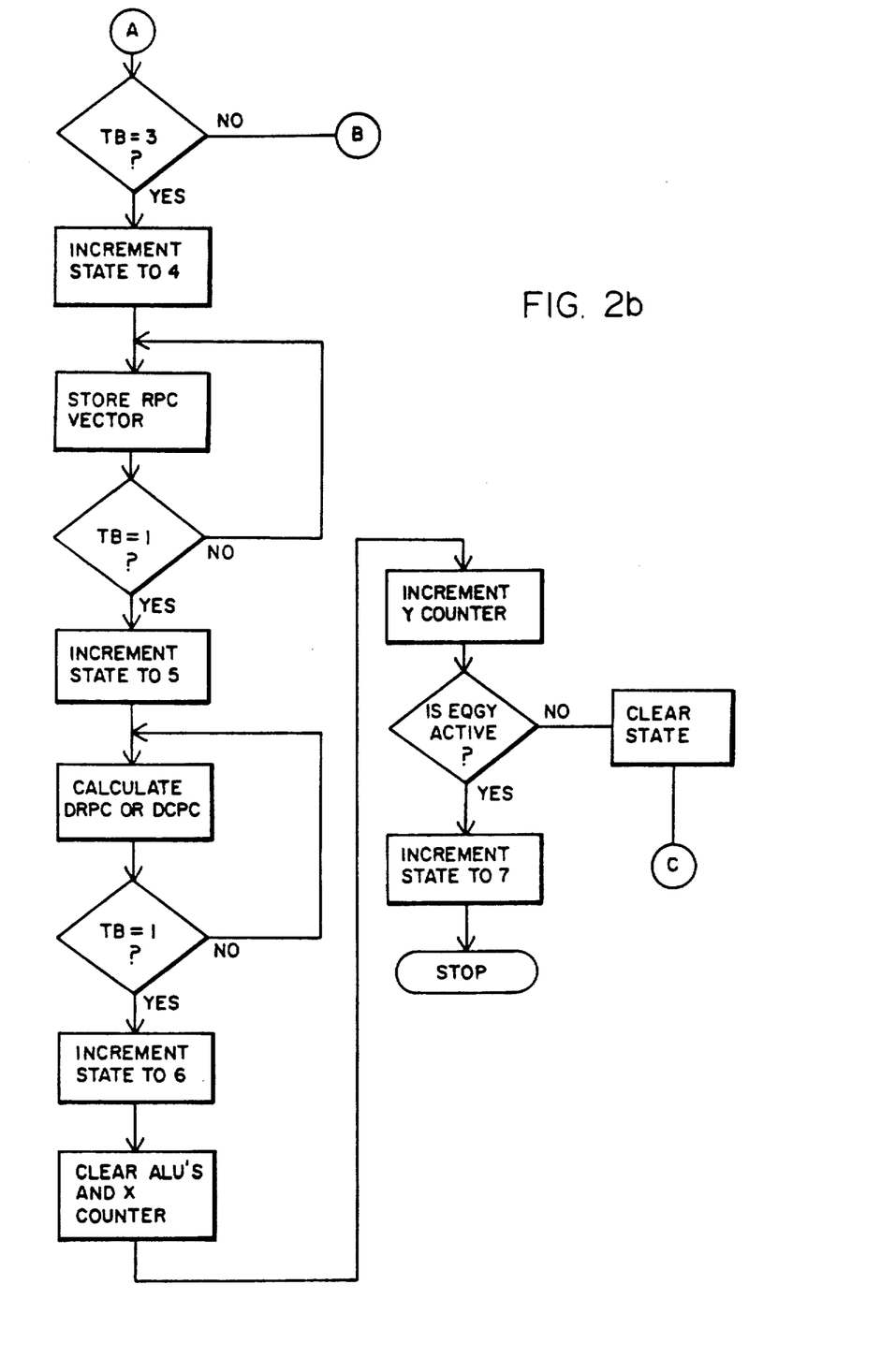
Figure 2C:
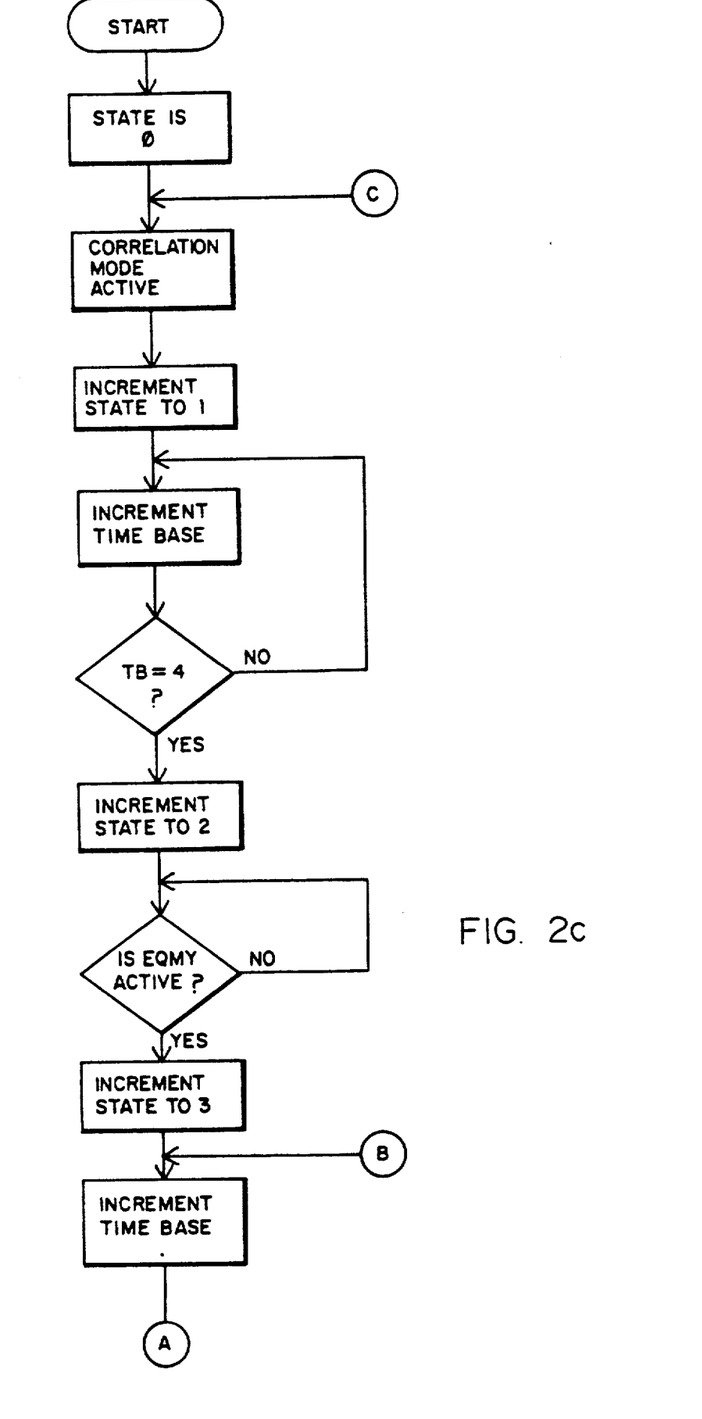
Figure 2D:
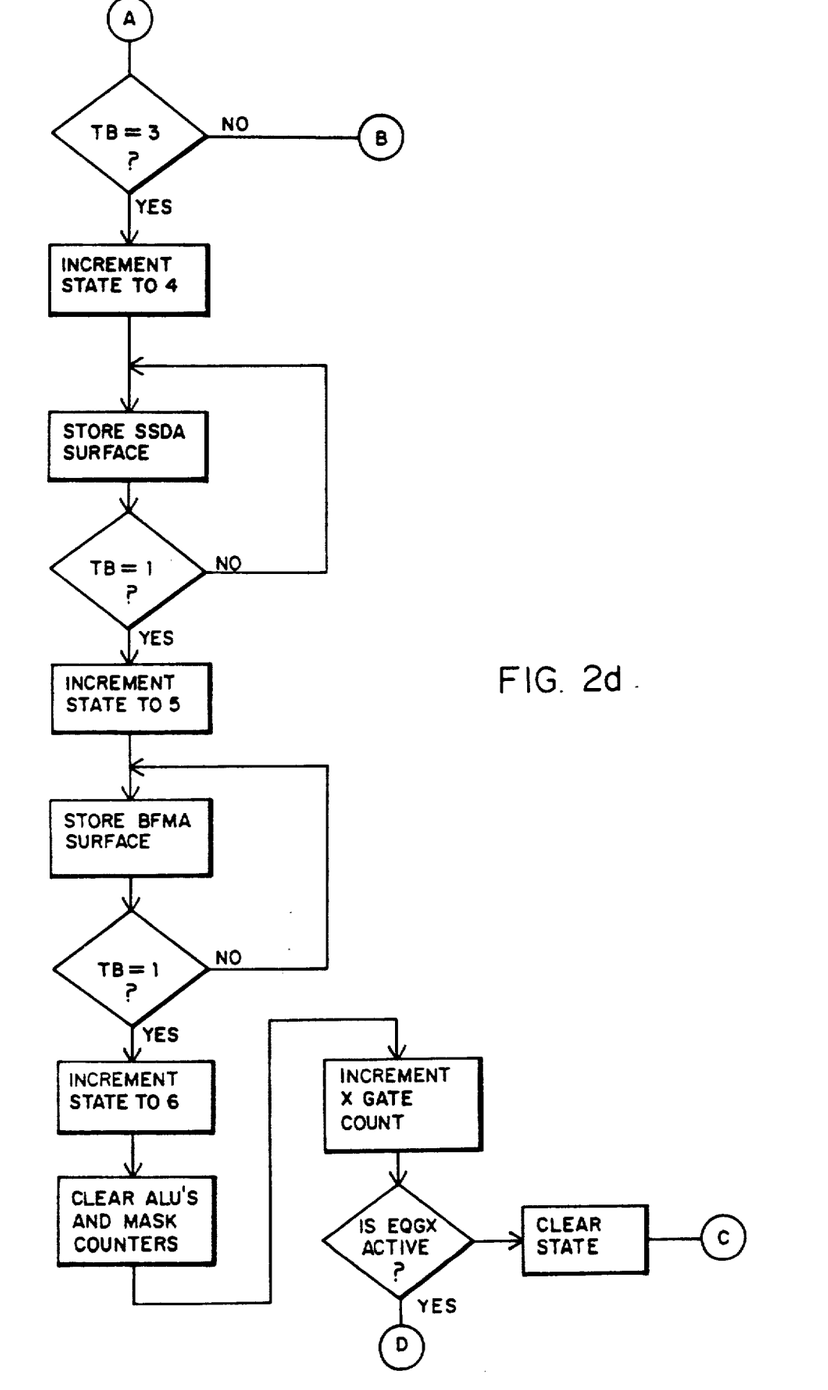
Figure 2E:
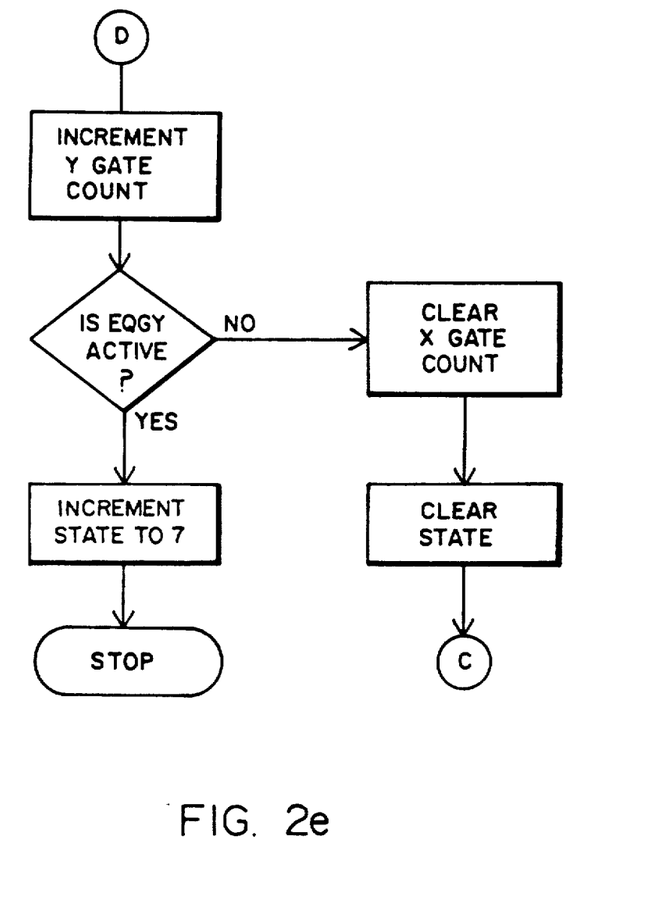

FIGS. 1a through 1c illustrate the architecture of the pre-processor 10 of this invention. In its preferred embodiment, the invention is implemented in a very large scale integrated (VLSI) gate array with more than 22,000 gates using 1.5μ CMOS technology. The pre-processor 10 runs at a clock rate of 16.67 MHz for a maximum throughput rate in excess of 83 MIPS.

Control of the pre-processor 10 is achieved through a twenty-two-pin general-purpose microprocessor interface 12 with one address pin, sixteen data pins, and five control pins. The provision of a single address pin, which results in a considerable saving in connections and buffers, is made possible by providing the address generator 14. When reading, or writing data, a single address pointer 15 is transmitted to the generator 14 over the data line 17. Thereafter, the generator 14 merely increments the address by 1 for each transmitted data byte. In this manner, a sequence of memory registers can be accessed for data entry or retrieval with a single address instruction.

During a first data pass, pipeline 16 computes the x-sums and y-sums of the centroid. Simultaneously, pipeline 18 computes the difference between the previous field's row and column pixel counts and those of the present one (DRPC and DCPC). Again simultaneously, pipeline 20 computes the row and column pixel accumulations for the centroid, as well as pixel intensity (if an intensity centroid is selected) or target intensity (if a geometric centroid is selected).

During a second data pass, pipeline 16 selectably computes either the BFMA or $\Delta^2$ correlation algorithm. Simultaneously, pipeline 18 computes the SSDA algorithm. During this second pass, pipeline 20 is idle.

Pipelines 22 and 24 compute the sine and cosine rotation compensation factors, respectively, as described in more detail hereafter. These pipelines are part of the address generator 14, and their output serves to maintain, for evaluation purposes, the orientation of the target image as the aircraft performs rotational maneuvers.

The pipelines 16, 18 and 20 are arranged to perform different calculations depending upon status and timebase signals produced by the interface controller 12. In addition to these signals, the controller 12 generates mode control signals in response to external mode selection inputs. It also serves as an interface between the tracker device and the pre-processor 10.

Memory registers which are preferably not physically part of the pre-processor 10 but directly participate in its operation are provided by the acquisition RAM 26 and the results, mask and reference (RMR) RAM 28. The acquisition RAM 26 is preferably a 16K × 8 RAM which allows a pilot-selected input image window of up to 128 × 128 pixels from a moving input image such as a forward-looking infrared (FLIR) video image to be stored. The RMR RAM 28 is preferably an 8K × 16 RAM and is used for storing the masks and references required for the correlation algorithms. The results of all algorithms are also stored in the RMR RAM 28.

The operation of the pre-processor 10 is best illustrated by the flow chart of FIGS. 2a-e. The pre-processing begins with state=0 (idle) and the selected centroid mode active. The state is then incremented to 1, and the pipeline is filled from the previously loaded acquisition memory 26 for four timebase intervals.

When the state is incremented to 2, the results of the selected centroid algorithm are calculated. The calculation continues along a row of the window until the end of the row is reached (EQGX active). The state is then incremented to 3 for 4 timebase intervals, during which the pipeline is emptied and the final sum of the pixels in the row is determined. This is the RPC vector, which is stored in RMR RAM 28 when the state is incremented to 4.

In centroid calculation, DRPC is calculated during state 5. In state 6, the pipelines 16, 18, 20 and the row (x) counter are cleared. The column (y) counter is then incremented, and the centroid algorithm is repeated with column data loaded into the pipelines. When all columns have been summed (EQRY active), the state is incremented to 7, and an interrupt is generated to the tracker processor indicating that the results of the pre-processing are ready to be read out. For this purpose, the RPC and CPC values computed by pipeline 18 are stored in the RMR RAM, while the maximum and minimum DRPC and DCPC are held a the output of pipeline 18.

The pre-processor 10 functions similarly in the correlation mode. However, in the correlation mode, the results from pipeline 18 are stored at state 4, and the results from pipeline 16 are stored at state 5.

Figure 3A:
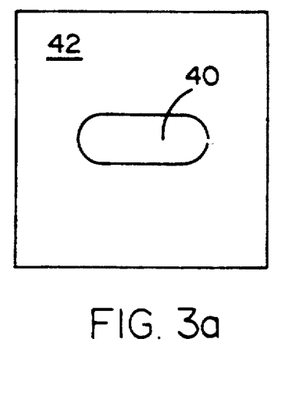
FIGS. 3a through 3c illustrate the effect of the rotation compensation program of this invention.
Figure 3B:
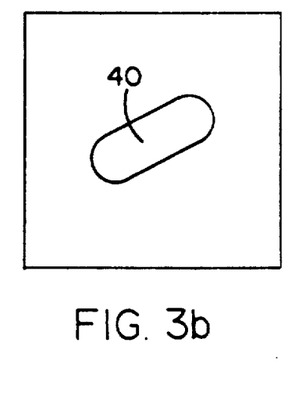
Figure 3C:
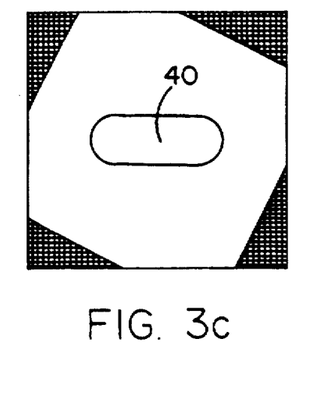

FIGS. 3a through 3c illustrate a feature of the invention which is useful in countering loss of correlation during violent rotational maneuvers of the aircraft. FIG. 3a shows a target 40 in an image 42 in one video field, while FIG. 3b shows the target 40 in the next video field if the aircraft has rotated 30° during that time.

In order to retain the same target aspect for pre-processing, the address generator 14 is provided with a pair of pipelines 22, 24 which, in response to an orientation signal provided by the tracker processor, computes address conversions that, in effect, result in the pipelines 16, 18, 20 being presented with the image of FIG. 3c in which the target 40 has the same aspect as in FIG. 3a.

The address generator 14 performs essentially the following derotation computation:

$$X = X' \cos\theta - Y' \sin\theta$$

$$Y = X' \sin\theta + Y' \cos\theta$$

where $X'$ and $Y'$ are the x- and y-addresses, respectively, of a given pixel in the derotated output image of FIG. 3c, X and Y are the x- and y-addresses of the same (i.e. conjugate) pixel in the input image of FIG. 3b, and $\theta$ is the angle of rotation.

Figure 4:
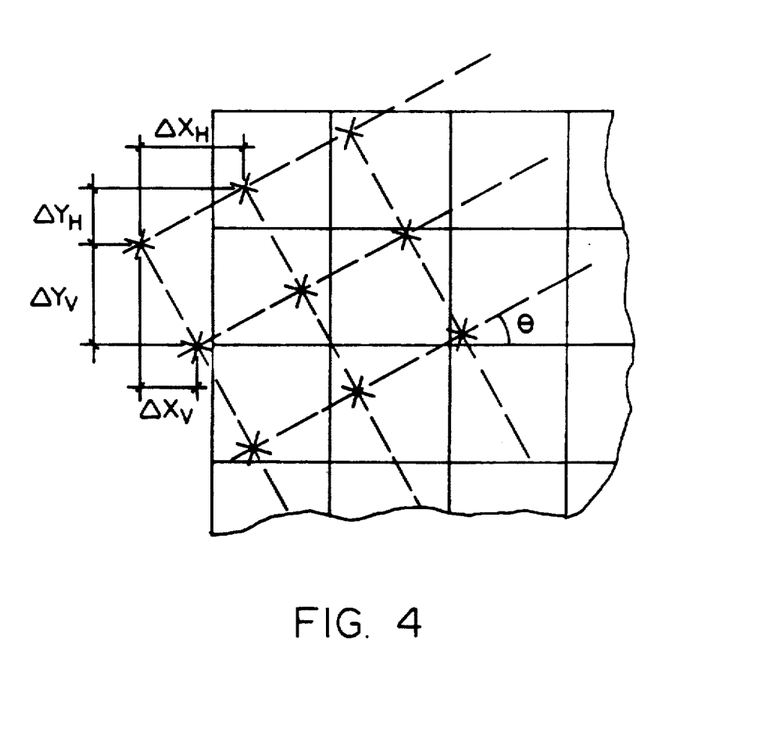
FIG. 4 is a diagram illustrating the operation of the rotation compensation program.

The strategy for computing the location of each point in the output image of FIG. 3c in the input reference frame of FIG. 3b is as follows, reference being had to FIG. 4:

1) Compute leftmost top coordinates of the output image in the input frame.
2) Step $\Delta X_H, \Delta Y_H$ units in the input frame to reach the next pixel in the current frame.
3) Continue to end of the line.
4) Step down $\Delta X_V, \Delta Y_V$ from the starting point of the previous line to reach the location of the starting point of the next line.
5) Continue the above row and column operations until entire output image has been covered.

$\Delta X_H, \Delta Y_H$, $\Delta X_V$ and $\Delta Y_V$ are computed as follows:

For any point $X'$, $Y'$ in the output frame, stepping to the next point in the line is equivalent to incrementing $X'$ while holding $Y'$ constant, i.e.

$$\begin{bmatrix} X + \Delta H_H \\ Y + \Delta Y_H \end{bmatrix} = \begin{bmatrix} \cos\theta & -\sin\theta \\ \sin\theta & \cos\theta \end{bmatrix} \begin{bmatrix} X' + 1 \\ Y' \end{bmatrix}$$

OR $$\begin{bmatrix} X \\ Y \end{bmatrix} + \begin{bmatrix} \Delta X_H \\ \Delta Y_H \end{bmatrix} = \begin{bmatrix} \cos\theta & -\sin\theta \\ \sin\theta & \cos\theta \end{bmatrix} \left( \begin{bmatrix} X' \\ Y' \end{bmatrix} + \begin{bmatrix} 1 \\ 0 \end{bmatrix} \right)$$

OR $$\begin{bmatrix} \Delta X_H \\ \Delta Y_H \end{bmatrix} = \begin{bmatrix} \cos\theta \\ \sin\theta \end{bmatrix}$$

Similarly for any point $X'$, $Y'$ in the output frame stepping down the next point in the column is equivalent to decrementing $Y'$ while holding $X'$ constant, i.e.

$$\begin{bmatrix} X + \Delta X_V \\ Y + \Delta Y_V \end{bmatrix} = \begin{bmatrix} \cos\theta & -\sin\theta \\ \sin\theta & \cos\theta \end{bmatrix} \begin{bmatrix} X' \\ Y' - 1 \end{bmatrix}$$

OR $$\begin{bmatrix} X \\ Y \end{bmatrix} + \begin{bmatrix} \Delta X_V \\ \Delta Y_V \end{bmatrix} = \begin{bmatrix} \cos\theta & -\sin\theta \\ \sin\theta & \cos\theta \end{bmatrix} \left( \begin{bmatrix} X' \\ Y' \end{bmatrix} + \begin{bmatrix} 0 \\ -1 \end{bmatrix} \right)$$

OR $$\begin{bmatrix} \Delta X_V \\ \Delta Y_V \end{bmatrix} = \begin{bmatrix} \sin\theta \\ -\cos\theta \end{bmatrix}$$

Figure 5:
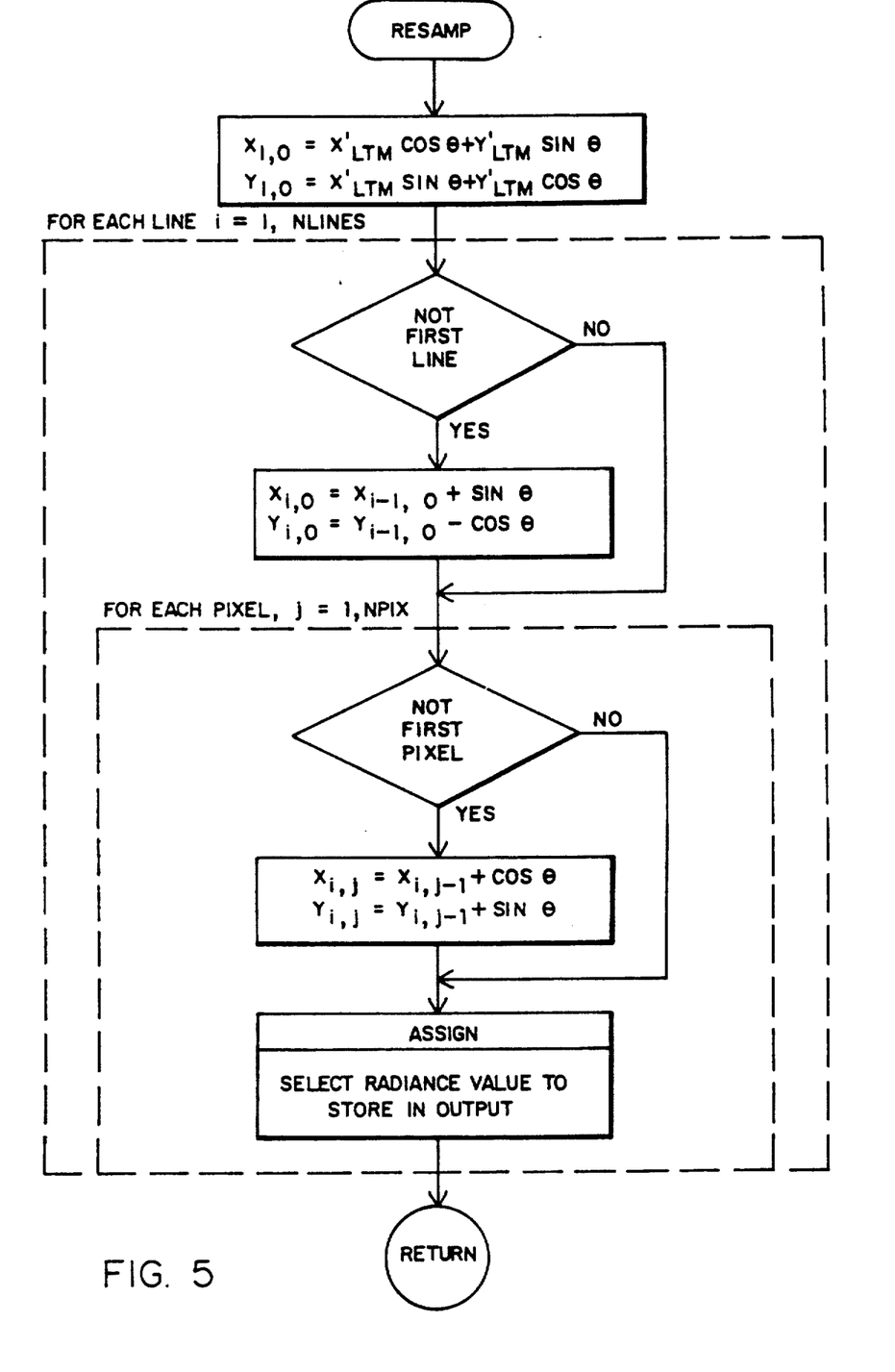
FIG. 5 is a flow chart diagram of the rotation compensation program.

The sequence of operations to carry out this operation is illustrated in the flow chart diagram of FIG. 5, which is self-explanatory.

We claim:

1. A pre-processor for a target tracking device, comprising:

a) memory means for storing input image, mask and reference information, and image analysis computation results;

b) interface means for providing mode and address pointer signals from said tracking device to said pre-processor, and for conveying data between said tracking device and said pre-processor;

c) an address generator for generating, in response to a single address pointer, a series of addresses for addressing portions of said memory means;

d) a plurality of accumulator pipelines each arranged to sequentially apply selected ones of a plurality of image analysis algorithms to addressed input image information in response to said mode signals provided by said tracking device; and e) means for storing the results of said application of algorithms in said memory means in accordance with addresses generated by said address generator;

f) said plurality of pipelines being arranged so that said input image information is simultaneously applied to each of said plurality of said pipelines, and g) said image analysis algorithms being so selected that said plurality of pipelines simultaneously apply different image analysis algorithms to said image information.

2. The pre-processor of claim 1, in which said address generator is arranged, in response to a signal indicating rotation of said input image information to modify said generated addresses to compensate for said rotation.

3. The pre-processor of claim 1, in which said simultaneously applied algorithms are centroid XSUM and YSUM, and centroid row and column pixel counters, together with differences therebetween, said algorithms being applied sequentially with the simultaneous application of a correlation algorithm selected from the group including a brightness feature match (BFMA) and a different squared ($\Delta^2$) and a sequential similarity detection (SSDA) algorithm.

* * * * *